United States Patent [19]
Brothers

[11] 3,895,991
[45] July 22, 1975

[54] MACHINE FOR JOINING A THERMOPLASTIC CAP TO A THERMOPLASTIC TUBE

[75] Inventor: Gene A. Brothers, Gering, Nebr.
[73] Assignee: Eltra Corporation, Toledo, Ohio
[22] Filed: June 6, 1974
[21] Appl. No.: 477,110

[52] U.S. Cl. .............. 156/457; 156/556; 156/497; 156/499
[51] Int. Cl.² .......................................... B29C 27/10
[58] Field of Search ........ 156/303.1, 293, 392, 423, 156/429, 457, 499, 500, 546, 547, 556, 578, 356, 69, 497, 391, 575

[56] References Cited
UNITED STATES PATENTS

| | | | |
|---|---|---|---|
| 2,927,622 | 3/1960 | Butler et al. | 156/423 |
| 3,386,350 | 6/1968 | Groberg | 156/457 |
| 3,456,564 | 7/1969 | McCandless | 156/69 |
| 3,523,852 | 8/1970 | Guerrero | 156/423 |
| 3,658,627 | 4/1972 | Kaminsky | 156/497 |

Primary Examiner—Douglas J. Drummond
Assistant Examiner—Jerome W. Massie
Attorney, Agent, or Firm—Robert H. Johnson

[57] ABSTRACT

A machine for joining a thermoplastic cap to a thermoplastic tube with a continuous circumferential fillet joint. The machine includes rollers for holding the tube and cap and rotating them together about the longitudinal axis of the tube. While the tube and cap are rotating an assembly is supplying fillet material to the junction of the tube and cap, pressing the fillet material against the junction, and locally heating the tube, cap and fillet material sufficiently to cause them to bond together.

3 Claims, 7 Drawing Figures

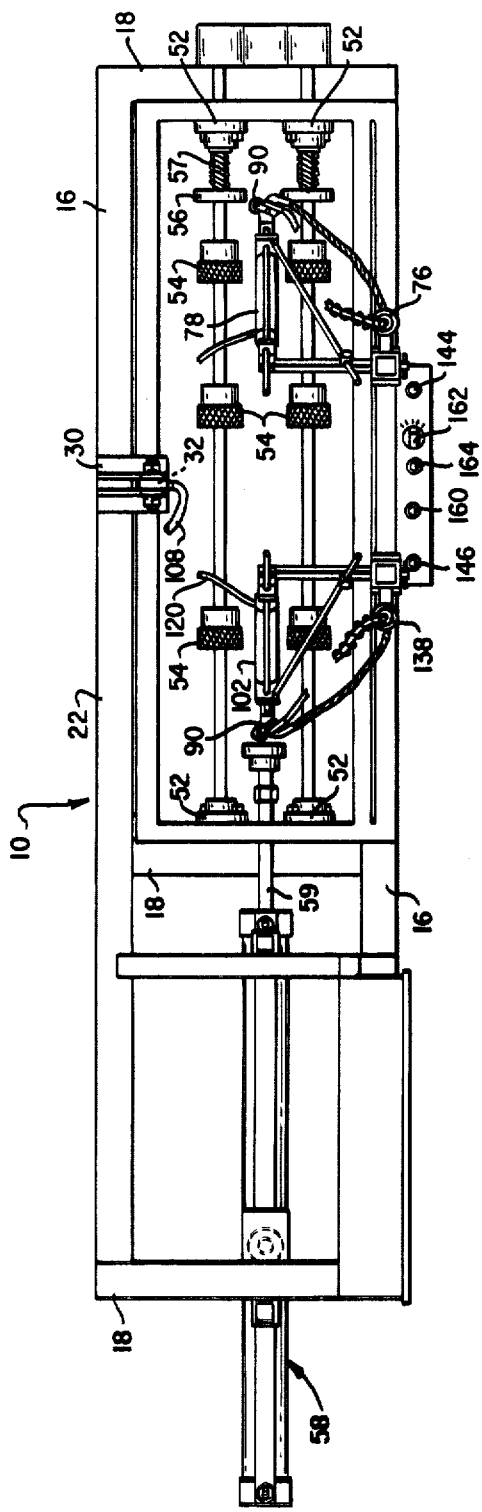
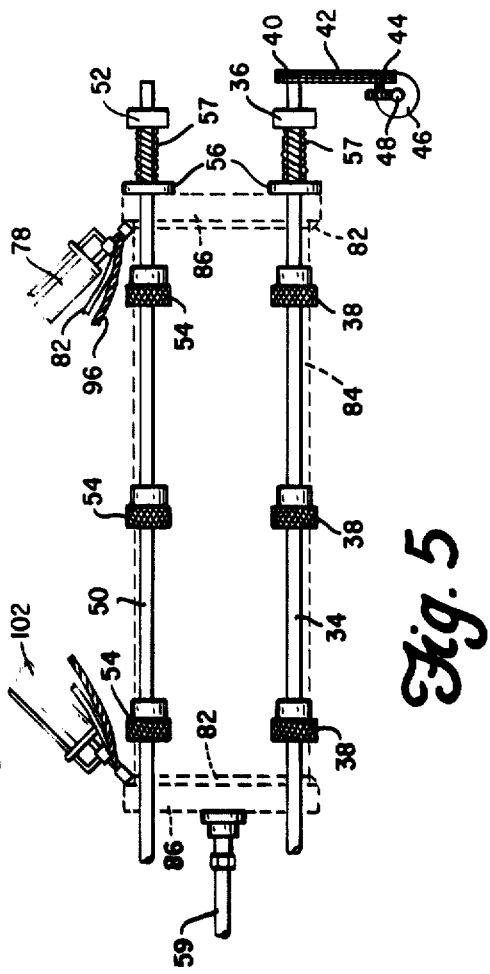
Fig. 2
Fig. 5

PATENTED JUL 22 1975 3,895,991

SHEET 3

PATENTED JUL 22 1975  3,895,991

SHEET 4

3,895,991

MACHINE FOR JOINING A THERMOPLASTIC CAP TO A THERMOPLASTIC TUBE

BACKGROUND OF THE INVENTION

The field of art to which this invention relates includes welding, and more specifically the joining of two thermoplastic items by an integral bond.

Previously, caps had been joined to tubes by means of hand-held equipment, but the joints made in this manner have not been fully satisfactory because it is difficult to make an acceptably uniform joint using hand-held equipment. This is especially true when material is being added to form a fillet joint. Further, the tubes often are not straight due to being cut to length from a coil of tubing and this contributes to the difficulty of making an acceptable fillet joint.

A principal object of my invention is to provide a machine for making a substantially uniform fillet joint in a thermoplastic tube and cap.

SUMMARY OF THE INVENTION

In carrying out my invention in a preferred embodiment there is provided a main frame which carries a first set of rollers mounted on parallel shafts. The shafts are connected to a motor so that the rollers can be driven in rotation.

A top frame is mounted on the main frame for movement relative thereto. A second set of rollers mounted on parallel shafts is carried by the top frame so that the spacing between the two sets of rollers can be varied.

The two sets of rollers cooperate with spring-biased stops carried by the shafts and a fluid motor carried by the main frame and actuatable toward the stops to support a tube for rotation about its longitudinal axis together with a cap and to hold the tube and cap in abutment.

Also carried by the top frame is an assembly which supplies fillet material to the junction of the cap and tube, presses the fillet material against the junction and heats the tube, cap and fillet material in the area where the fillet material is pressed against the junction sufficiently to cause them to form an integral bond. By rotating the tube and cap relative to this assembly a continuous circumferential fillet joint can be formed.

The above and other objects, features and advantages of my invention will be more easily understood by persons skilled in the art when the detailed description is taken in conjunction with the drawing.

BRIEF DESCRIPTION OF THE DRAWING

FIG. 2 is a plane view of the machine shown in FIG. 1,

FIG. 5 is a fragmentary view showing to advantage how a tube and two caps are held for rotation by the two sets of rollers.

DESCRIPTION OF THE PREFERRED EMBODIMENT

Figure 1:
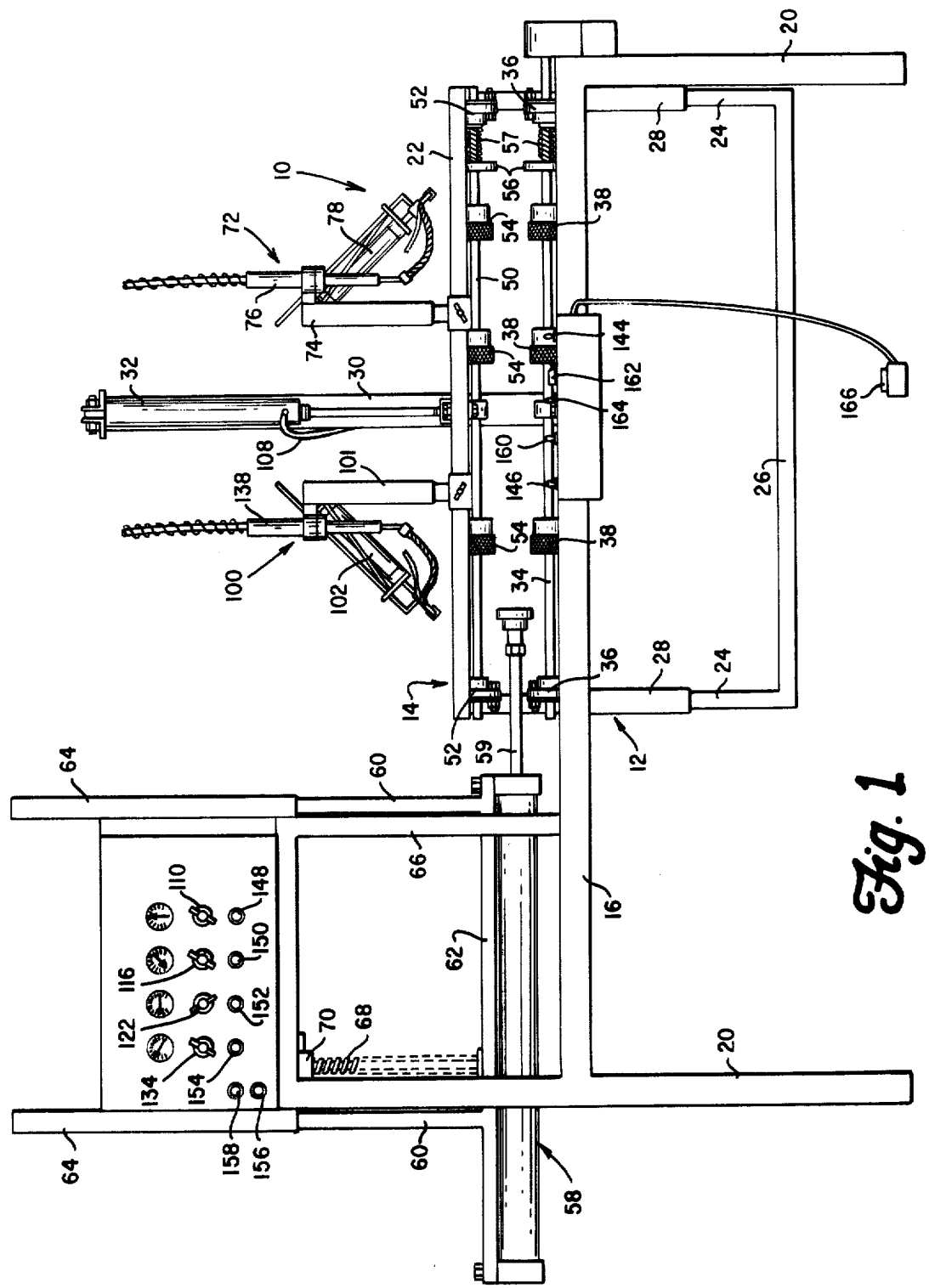
FIG. 1 is a front elevation of a machine embodying my invention.
Figure 3:
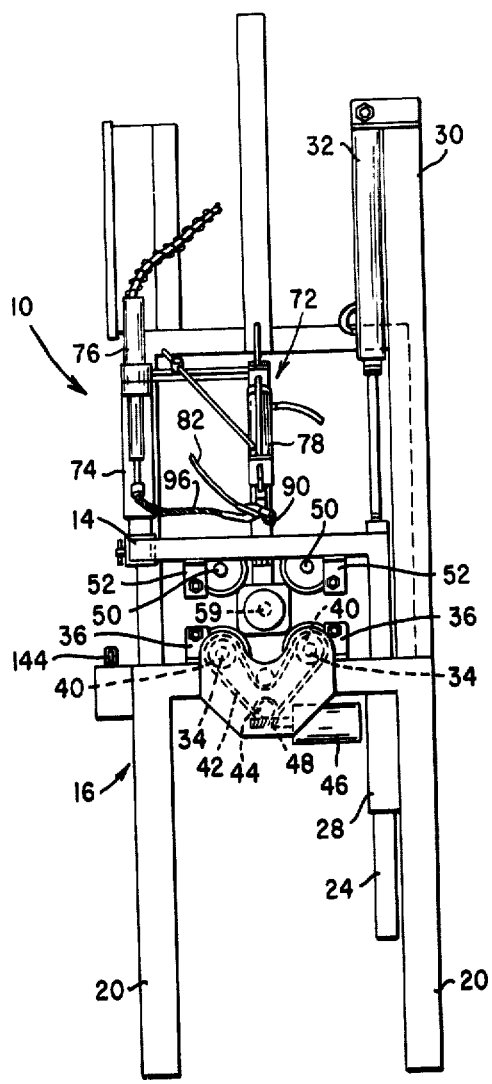
FIG. 3 is a right end elevation of the machine shown in FIG. 1.

Referring now to FIGS. 1, 2 and 3, the reference numeral 10 denotes a machine which includes a main frame 12 and a top frame 14. Main frame 12 includes a pair of longitudinally extending beams 16 connected by cross-members 18, the beams and cross-members being supported by four legs 20. Top frame 14 has a generally rectangular member 22 connected to a pair of vertically extending rods 24 which are connected at their lower ends by a cross-member 26. Rods 24 are slidably disposed in a pair of sleeves 28 which are fixed to main frame 12 so that top frame 14 is movable vertically relative to main frame 12.

Extending upwardly from main frame 12 is a support 30. A single acting piston and cylinder type fluid actuator 32 is connected at one end to support 30 and at the other end to top frame 14 so that when pressurized fluid is supplied to actuator 32 it will retract and elevate top frame 14.

A pair of transversely spaced apart and parallel shafts 34 are journaled for rotation in trunnions 36 mounted on main frame 12. Carried by each shaft is a plurality of knurled rollers 38. Each roller 38 is movable longitudinally along the shaft which carries it, but is fixed to rotate with the shaft. Connected to one end of each shaft 34 is a sprocket wheel 40. Both sprockets 40 mesh with a sprocket chain 42 which also meshes with another sprocket wheel 44 which is drivingly connected to a variable speed electric motor 46 by means of a worm gear drive 48. Thus, operation of motor 46 will cause rotation of shafts 34, and hence rollers 38 in the same direction so that a tube supported by rollers 38 will be caused to rotate, as will be more fully explained hereinafter.

A pair of transversely spaced apart and parallel shafts 50 are journaled for rotation in trunnions 52 which are connected to rectangular member 22 of top frame 14. Carried by shafts 50 are a plurality of knurled rollers 54 which are movable longitudinally along shafts 50, but connected to shafts 54 conjoint rotation.

Mounted on each one of shafts 34 and 50 is a stop 56. Disposed between each stop 56 and the adjacent trunnion is a compression spring 57 which permits limited rightward movement of the respective stop 56. Stops 56 assist in holding a cap in abutment with a tube as will be explained more fully hereinafter.

Cooperating with stops 56 to hold one or more caps in abutment with a tube supported on rollers 38 is a double-acting piston and cylinder type fluid actuator 58 with a piston rod 59. Actuator 58 is connected to a pair of vertically extending rods 60 by means of a cross-member 62. Rods 60 are slidably disposed in a pair of sleeves 64 which are connected to a control panel support 66 that is mounted on main frame 12. Connected between cross-member 62 and support 66 is a worm gear mechanism 68 driven by an electric motor 70 for raising and lowering actuator 58 in order to position it substantially coaxial with the longitudinal axis of whatever diameter tube that is being supported by rollers 38.

Mounted on rectangular member 22 of top frame 14 and movable to adjusted positions therealong is a pair of assemblies 72 and 100. Assembly 72 includes a support 74 which carries a heater unit 76 and a single-acting piston and cylinder type fluid actuator 78 which preferably is inclined at approximately 45° to the horizontal. Similarly, assembly 100 includes a support 101 which carries a heater unit 138 and a single-acting piston and cylinder type fluid actuator 102.

Figure 6:
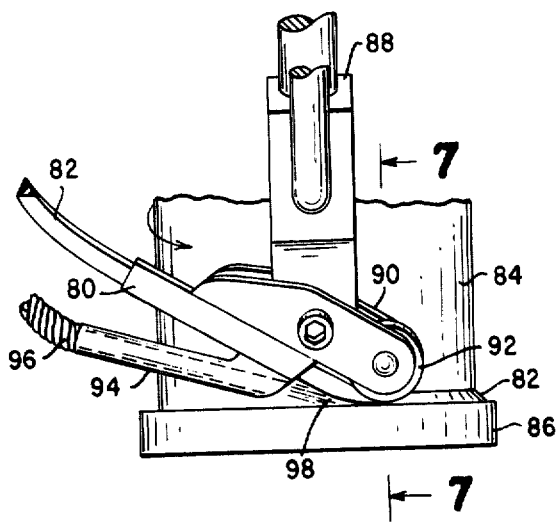
FIG. 6 is an enlarged fragmentary view showing to advantage the assembly for applying fillet material to the junction of a tube and cap.
Figure 7:
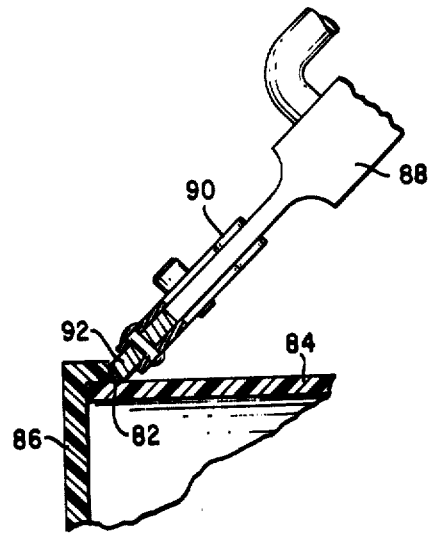
FIG. 7 is a sectional view taken along line 7—7 of FIG. 6.

Referring now also to FIGS. 6 and 7, it will be seen that a tube 80 is attached to a bifurcated support 90 mounted at the end of rod 88 of actuator 78. Tube 80 is adapted to slidably hold thermoplastic fillet material 82 and dispense it at the junction between a thermoplastic tube 84 and a thermoplastic end cap 86 held between rollers 38 and 54, as can be more clearly seen in FIG. 5. Fillet material 82 and tube 80 preferably are triangular in cross section, although other cross-sectional shapes could be utilized. Also connected to rod 88 of actuator 78 by means of bifurcated support 90 is a wheel 92 which serves to press fillet material 82 against the junction of tube 84 and cap 86. Mounted on sleeve 80 is a nozzle 94 which is connected by means of a flexible conduit 96 to heater unit 76 so that heated air is blown into area 98. Assembly 100 is an allochiral duplicate of assembly 72, and so will not be described in detail.

Figure 4:
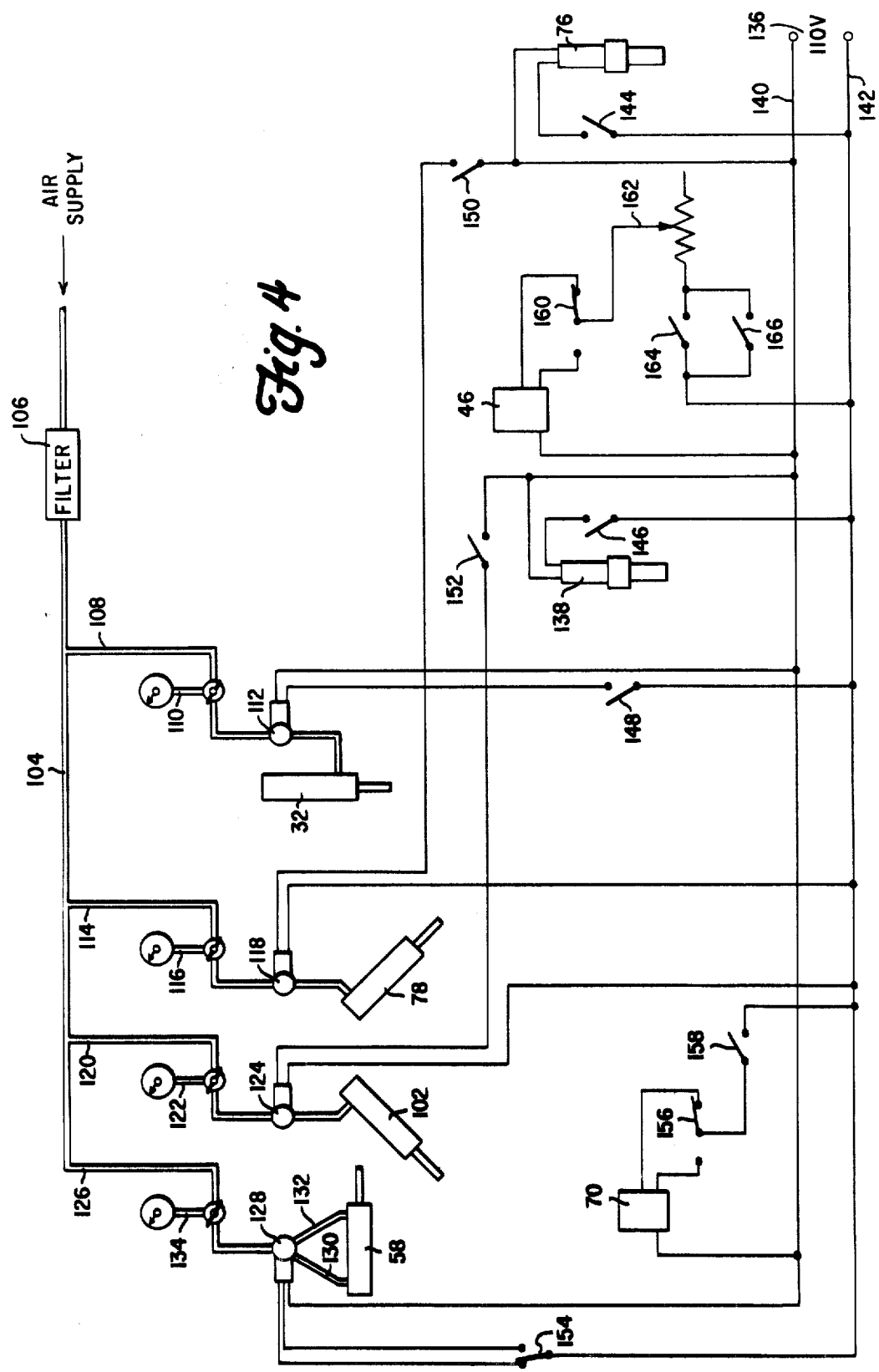
FIG. 4 shows schematically the fluid and electrical circuitry associated with the machine of FIG. 1.

Referring now to FIG. 4, the electrical and fluid circuitry of machine 10 will be described. A main conduit 104 is connected to a source of pressurized air via a filter 106. A branch conduit 108 connects main conduit 104 with actuator 32. Disposed in conduit 108 is a combined gauge and regulator 110 and a solenoid operated valve 112 which is operable in one position to permit pressurized air to be delivered to actuator 32 to cause it to retract and in another position to block communication of pressurized air to actuator 32 and connect actuator 32 with the atmosphere.

Also connected to main conduit 104 is a branch conduit 114 which is connected to the head end of actuator 78 so that when pressurized air is supplied to actuator 78 it is caused to extend. Disposed in branch conduit 114 is a combined pressure regulator and gauge 116 and a solenoid operated valve 118 which functions in the same manner as valve 112. Similarly, a branch conduit 120 is connected to main conduit 104 and communicates with the head end of actuator 102. Likewise, a combined regulator and gauge 122 and a solenoid operated valve 124 are disposed in conduit 120. Finally, a branch conduit 126 communicates with a solenoid operated valve 128 which in turn communicates with the head and rod ends of actuator 58 by means of conduits 130 and 132, respectively. Disposed in conduit 126 is a combined pressure regulator and gauge 134. Valve 128 is operable in one position to direct pressurized air through conduit 130 to the head end of actuator 58 causing the actuator to extend, while connecting conduit 132 with the atmosphere and operable in a second position to communicate pressurized air via conduit 132 with the rod end of actuator 58, causing it to retract, while connecting conduit 130 with the atmosphere.

Machine 10 is adapted to be connected to a source of electrical power 136 which preferably is 110 volts alternating current. Connected to power supply 136 are a pair of feeder lines 140 and 142. Heater unit 76 is connected in series with an on-off switch 144 across lines 140 and 142. Similarly, heater unit 138 is connected in series with an on-off switch 146 across lines 140 and 142. The solenoid of valve 112 is connected in series with a switch 148 across feeder lines 140 and 142 so that when switch 148 is closed valve 112 will be actuated to communicate pressurized air to actuator 32. The solenoids of valves 118 and 124 are connected in series with on-off switches 150 and 152, respectively, across feeder lines 140 and 142. In both cases when the respective switches are closed the valves are actuated to supply pressurized air to the respective actuator. The solenoid of valve 128 is connected in series with a double throw switch 154 across lines 140 and 142 so that when switch 154 is in one position the solenoid actuates valve 128 to communicate pressurized air to conduit 130 and when switch 154 is in its other position the solenoid is energized to actuate valve 128 to communicate pressurized air to conduit 132.

Motor 70 is connected across lines 140 and 142 in series with a reversing switch 156 and an on-off switch 158. When switch 156 is in the position shown, motor 70 will be actuated to rotate worm screw 68 to raise cylinder 56, and when switch 156 is in its other position motor 70 will be actuated to rotate worm screw 68 to lower actuator 58.

Motor 46 is connected across lines 140 and 142 by means of a direction control switch 160 connected in series with a speed control 162 and on-off switch 164. Connected in parallel with switch 164 is an on-off switch 166 which is adapted to be foot controlled.

I will now explain the operation of my invention. Switch 148 is closed so that top frame 14 is raised. An operator then places a thermoplastic tube 84 on rollers 38 and positions end caps 86 on the ends of tube 84, as shown in FIG. 5. The operator next opens the switch 148 which permits top frame 14 to lower due to its own weight until rollers 54 engage tube 84. It has been found that the weight of top frame 14 is sufficient to straighten tube 84, but if additional force were required for straightening it could be accomplished through the use of a double-acting actuator in place of the single-acting actuator 32, for example. Switch 154 is next actuated by the operator so that actuator 58 is energized to extend, and thus push against the adjacent end cap 86. This rightward bias of actuator 58 is opposed by springs 57 since stops 56 and in abutment with the adjacent end cap 86. As a result end caps 86 are held in abutment with the ends of tube 84. At this point it should be noted that for varying diameters of tubes 84 it is desirable to maintain actuator 58 substantially coaxial with the longitudinal axis of the tube, and so the operator may find it necessary to operate motor 70 to move actuator 58 up or down, as required.

With tube 84 and end caps 86 held in position between rollers 38 and 54 and stops 56 and actuator 58, assemblies 72 and 100 are first adjusted longitudinally along top frame 14 and then actuators 78 and 102 are energized by closing switches 150 and 152 to cause actuators 78 and 102 to extend and bring the wheels of assemblies 72 and 100 into contact with the tube and end caps at their junctions. This can best be seen in FIGS. 5 and 6. In the meanwhile, the operator preferably has closed switches 144 and 146 so that heating units 76 and 138 have had an opportunity to come up to temperature and are, in the case of heating unit 76, for example, blowing heated air out of nozzle 94.

At this point only the operation of assembly 72 will be described in detail, since the operation of assembly 100 is the same. After assembly 72 has been brought into contact with the respective junction of tube 84 and end cap 86, the operator pushes a length of fillet material 82 through sleeve 80 until it abuts the junction of the tube and end cap. Because heated air is being supplied to the area 98, the portion of fillet material 82 protruding from sleeve 80 will be softened. Thus, fillet material 82 will adhere to tube 84 and end cap 86.

Now the operator closes either switch 164 or 166, depending upon whether he desires to utilize hand or foot operation, switch 160 having previously been set for forward rotation and speed control 162 having been positioned for proper rotational speed, and tube 84 and end caps 86 start to rotate in a clockwise direction as viewed from the end shown in FIG. 3. This causes fillet material 82 to be pulled through sleeve 80 and under wheel 92 where it is pressed against tube 82 and end cap 86 at the junction thereof. Further, as rotation of tube 84 and end cap 86 continues, new areas of tube 84, end cap 86 and fillet material 82 are heated and then pressed together under roller 92 until a continuous circumferential joint between tube 84 and end cap 86 has been completed. Contemporaneously a similar joint is being formed by assembly 100. The rotation of tube 84 is stopped by opening switch 164 and the unused portion of fillet material is cut away from the now completed fillet joints and switches 150 and 152 are opened so that assemblies 72 and 100 may be manually moved away from tube 84. Finally, switch 148 is closed so that top frame 14 is raised to permit tube 84 to be removed from machine 10. While this description has been directed to making two joints at the same time between a tube and end caps at each end of the tube, it will be understood that machine 10 can be used to make only one joint at a time between a tube and end cap, and in such operation either assembly 72 or assembly 100, as desired could be used.

The above detailed description is intended to be illustrative only. My invention is subject to various modifications, changes and the like without departing from the scope and spirit of it. Consequently, the limits of my invention should be determined from the claims appended hereto.

What is claimed:

1. A machine for joining a thermoplastic cap to a thermoplastic cylindrical tube comprising a main frame, a top frame carried by said main frame and movable relative thereto, first roller means mounted on said main frame, second roller means mounted on said top frame, said top frame means being movable by its weight so that a tube supported between said roller means will be restrained and straightened, stop means carried by said roller means, biasing means carried by said main frame, said roller, stop and biasing means cooperating to support a tube for rotation about its longitudinal axis and to hold a cap in abutment with one end of the tube, an assembly carried by said top frame for supplying thermoplastic fillet material to the junction of the tube and cap, pressing the fillet material against the junction and locally heating the cap, tube and fillet material in the area where the fillet material is pressed against the junction to a temperature at which the cap, tube and fillet material soften sufficiently to bond to each other, and means connected to one of said roller means for driving said one roller means and causing the tube supported by said roller means to rotate about its longitudinal axis so that a continuous circumferential fillet joint is formed between the cap and tube.

2. A machine as set forth in claim 1 wherein each said roller means includes a pair of parallel shafts and a plurality of spaced apart rollers carried by each shaft.

3. A machine as set forth in claim 2 wherein said stop means is spring biased in opposition to said biasing means.

* * * * *